(12) United States Patent
Rataj et al.

(10) Patent No.: US 12,528,140 B2
(45) Date of Patent: Jan. 20, 2026

(54) OPTICAL DEVICE FOR SHAPING AN ELECTROMAGNETIC WAVE BEAM AND USE THEREOF, BEAM TREATMENT DEVICE AND USE THEREOF, AND BEAM TREATMENT METHOD

(71) Applicant: Bystronic Laser AG, Niederoenz (CH)

(72) Inventors: Thomas Rataj, Berlin (DE); Markus Steinlin, Zurich (CH); Simon Scheidiger, Langenthal (CH)

(73) Assignee: Bystronic Laser AG, Niederoenz (CH)

( * ) Notice: Subject to any disclaimer, the term of this patent is extended or adjusted under 35 U.S.C. 154(b) by 0 days.

(21) Appl. No.: 16/965,921

(22) PCT Filed: Jan. 28, 2019

(86) PCT No.: PCT/EP2019/052003
§ 371 (c)(1),
(2) Date: Jul. 29, 2020

(87) PCT Pub. No.: WO2019/145536
PCT Pub. Date: Aug. 1, 2019

(65) Prior Publication Data
US 2020/0398373 A1 Dec. 24, 2020

(30) Foreign Application Priority Data
Jan. 29, 2018 (EP) .................................... 18153878

(51) Int. Cl.
*B23K 26/06* (2014.01)
*B23K 26/04* (2014.01)
*B23K 26/38* (2014.01)

(52) U.S. Cl.
CPC ........ *B23K 26/0648* (2013.01); *B23K 26/048* (2013.01); *B23K 26/0643* (2013.01); *B23K 26/38* (2013.01)

(58) Field of Classification Search
CPC .............. B23K 26/048; B23K 26/0643; B23K 26/0648; B23K 26/38; B23K 26/043;
(Continued)

(56) References Cited

U.S. PATENT DOCUMENTS 4,383,168 A * 5/1983 Luck, Jr. ................. B23K 26/04
250/201.4
5,280,491 A * 1/1994 Lai ......................... B23K 26/06
359/347

(Continued)

FOREIGN PATENT DOCUMENTS

DE    102014210118    12/2015
DE    102015101263    7/2016
(Continued)

*Primary Examiner* — Brian W Jennison
(74) *Attorney, Agent, or Firm* — Workman Nydegger

(57) ABSTRACT

A an optical device for shaping an electromagnetic wave beam and a use thereof, a beam treatment device and a use thereof, and a beam treatment method are provided. The optical device has an optical element positioned within beam propagation direction, and an exciter means functionally connected to the optical element for inducing an oscillation of the focal point in at least one of an x direction and any direction of a plane perpendicular to the beam propagation direction along a focal point oscillation path.

19 Claims, 13 Drawing Sheets

Figure 1A:
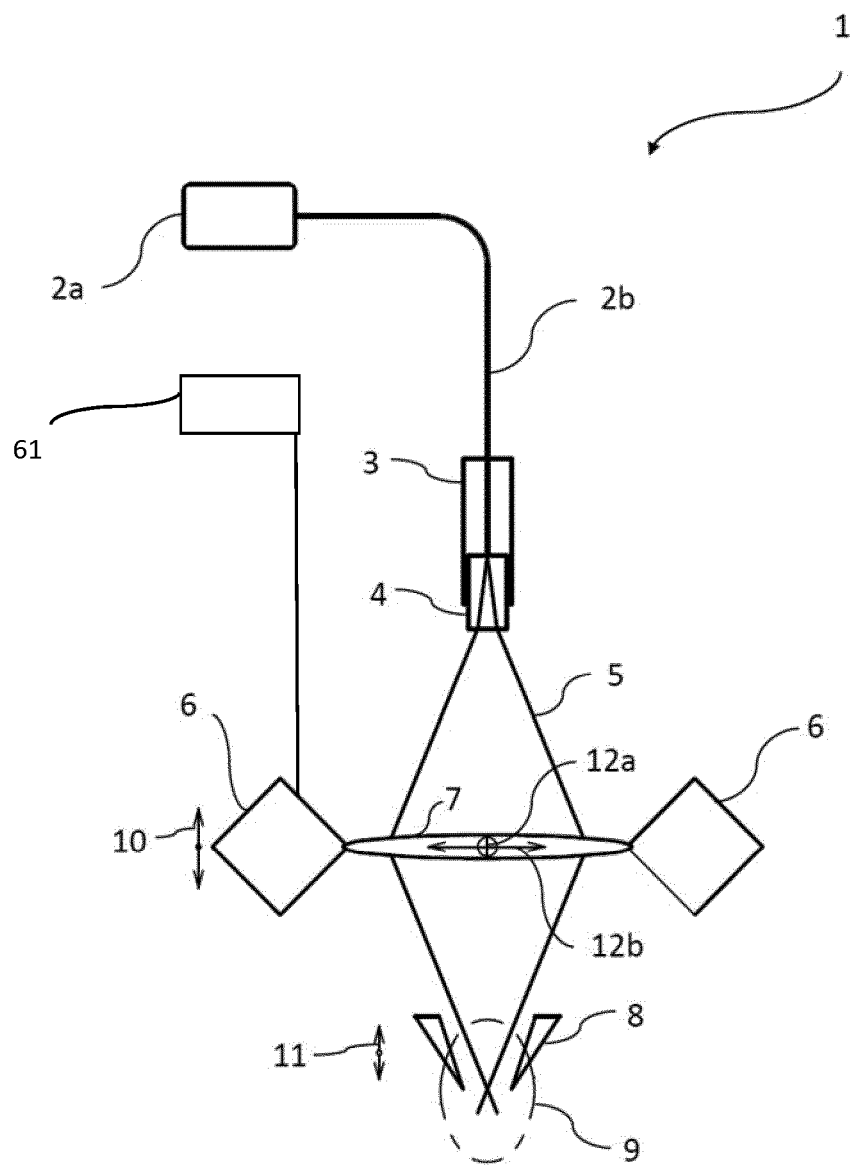

(58) Field of Classification Search
CPC .. B23K 26/06; B23K 26/062; B23K 26/0622; B23K 26/082; G02B 7/023
USPC .................................................. 359/813, 823
See application file for complete search history.

(56) References Cited

U.S. PATENT DOCUMENTS

| | | | | |
|---|---|---|---|---|
| 5,571,430 | A * | 11/1996 | Kawasaki | B23K 26/082 219/121.78 |
| 8,711,456 | B2 * | 4/2014 | Hofmann | G02B 26/0841 359/200.8 |
| 8,781,269 | B2 | 7/2014 | Huber et al. | |
| 9,156,108 | B2 | 10/2015 | Nomaru | |
| 9,250,390 | B2 | 2/2016 | Muendel et al. | |
| 2006/0032839 | A1* | 2/2006 | Eberhardt | B23K 26/08 219/121.75 |
| 2011/0297654 | A1* | 12/2011 | Yoshikawa | B23K 26/082 219/121.62 |
| 2012/0125901 | A1* | 5/2012 | Chen | B23K 26/046 359/811 |
| 2013/0134142 | A1 | 5/2013 | Morikazu | |
| 2013/0200052 | A1* | 8/2013 | Wittwer | B23K 26/046 219/121.75 |
| 2014/0216648 | A1* | 8/2014 | Geiger | B29C 66/1122 156/272.8 |
| 2015/0034617 | A1* | 2/2015 | Sawabe | B23K 26/067 219/121.73 |
| 2015/0151382 | A1* | 6/2015 | Chou | B23K 26/0876 219/121.75 |
| 2015/0343562 | A1* | 12/2015 | Hirose | B23K 26/55 264/400 |
| 2016/0266393 | A1 | 9/2016 | Trela-McDonald et al. | |
| 2018/0169792 | A1* | 6/2018 | Sako | B23K 26/064 |

FOREIGN PATENT DOCUMENTS

| | | | | |
|---|---|---|---|---|
| EP | 2711121 | | 3/2014 | |
| EP | 2762263 | | 8/2014 | |
| EP | 2778746 | | 9/2014 | |
| EP | 2894004 | | 7/2015 | |
| JP | 2013-248624 | | 12/2013 | |
| JP | 2015080799 | A * | 4/2015 | .......... B23K 26/073 |
| JP | 2017-139471 | | 8/2017 | |
| WO | WO-2015156119 | A1 * | 10/2015 | ............ B23K 26/00 |

\* cited by examiner

OPTICAL DEVICE FOR SHAPING AN ELECTROMAGNETIC WAVE BEAM AND USE THEREOF, BEAM TREATMENT DEVICE AND USE THEREOF, AND BEAM TREATMENT METHOD

The present invention is directed to an optical device for shaping an electromagnetic wave beam and a use thereof, a beam treatment device and a use thereof, and a beam treatment method.

A main demand on treatment of workpieces using an electromagnetic wave beam, e.g. laser beam cutting of metal sheets, is to improve the quality of the treated workpieces.

For example when cutting a metal sheet using a laser beam, an assist gas is typically used, which may be active or inert. Using oxygen as active gas, the metal is burned and vaporized after being heated up to ignition temperature by the laser beam. The reaction between oxygen and the metal actually creates additional energy in the form of heat, which supports the cutting process. The molten liquid metal, which has very low viscosity, is removed from the cut by the shear force of the oxygen jet. When cutting with an inert gas, such as nitrogen, the material is molten solely by the laser power and blown out of the cut kerf by the kinetic energy of the gas jet.

For obtaining a high quality of the treated workpiece, an optimized beam quality is desired, which can be realized by varying the beam spot diameter and, if necessary, the beam spot shape. The beam spot can be understood as intensity distribution of the electromagnetic wave beam perpendicular to its propagation direction, e.g. within the focal plane. An adjustment of the beam spot depending on the thickness and on the material of the workpiece to be treated, as well as depending on the specific type of treatment, may result in an increased performance of the beam treatment device.

The beam quality can e.g. be varied by changing the beam spot diameter at constant propagation angle, in order to adjust the Beam Parameter Product (BPP). In order to implement this type of beam shaping using typical beam treatment heads, additional optical components such as lenses or transport fibers are required. However, in particular when treating workpieces with high power laser beams (>1 kW), use of additional optical components within the free path of the laser beam can be disadvantageous.

U.S. Pat. No. 8,781,269 B2 discloses a method for generating a laser beam with different beam profile characteristics. A laser beam is coupled into one fiber end of a multi-clad fiber. To generate different beam profile characteristics of the output laser beam the input laser beam is electively coupled either into the inner fiber core or into one outer ring core of the multi-clad fiber.

U.S. Pat. No. 9,250,390 B2 is directed to a material laser beam processing system. By varying the input convergence angle and/or launch angle of the laser beam launched into a waveguide, the output spot size can be continuously varied.

EP2762263 A1 discloses a laser cutting with a ring beam having inner and outer diameters that tend to expand after passing through a focus position of a condenser lens.

EP 2778746 B1 describes an optical device for beam formation which has two plate-shaped optical elements whose thickness profiles are inverse to each other.

DE 102015101263 A1 illustrates two plate-shaped optical elements having circular surface patterns including alternating inclined facets and being positioned within the collimated laser beam.

US20160266393 A1 discloses a field mapping optical system and method for converting a light beam having a known spatially coherent first optical field to a second optical field with a required intensity distribution and flat wave front at a desired distance from the system, by creating an intermediate optical field, between the first and second optical fields, the intermediate optical field being derived from the inverse Fourier transform of the second optical field.

EP2894004 B1 is directed to a device for laser machining with a camera and a movable mirror.

DE 102014210118 A1 discloses an optical system having an external housing and an internal housing movably supported within the external housing. The internal housing includes at least a collimating lens and a focusing lens. The internal housing is radially movable by radial bearings.

A task of the invention is to provide an improved optical device for shaping an electromagnetic wave beam, and/or an improved beam treatment device, and/or an improved beam treatment method.

This object is achieved by an optical device for shaping an electromagnetic wave beam according to claim 1, a use according to claim 17, a beam treatment device according to claim 18, a use according to claim 19, and a beam treatment method according to claim 20.

One embodiment of the invention is directed to an optical device for shaping an electromagnetic wave beam, the beam being generated by a source and having a beam propagation direction and a focal point, including an optical element positioned within beam propagation direction, and an exciter means functionally connected to the optical element for inducing an oscillation of the focal point in at least one of an x direction and a y direction of a plane perpendicular to the beam propagation direction along a controllable focal point oscillation path, the x and y directions being non-parallel to each other, wherein the exciter means has at least a first exciter unit for inducing the x direction component of the focal point oscillation and at least a second exciter unit for inducing the y direction component of the focal point oscillation, the optical device further including a control unit for controlling the exciter means. The functional connection of the respective optical element to the exciter means is for inducing an oscillating repetitive movement exclusively of the optical element.

Due to inducing focal point oscillation, the above embodiment allows providing a beam spot having an increased diameter within the x-y plane, resulting in an increased Beam Parameter Product (BPP). Moreover, because of the focal point oscillation, the beam spot originally output from the beam source can be moved laterally with respect to the propagation direction of the beam, whereby in case of a cutting process the energy input into the cutting edge of the workpiece is improved as compared to the non-oscillated beam spot. In addition, since the exciter means of above embodiment can be implemented with optical elements typically provided in any device providing an electromagnetic wave beam, such as a beam treatment or cutting head, a beam shaping can be realized without necessity for additional optical components located within the free path of the electromagnetic wave beam. The electromagnetic wave beam may for instance be a laser beam.

In some embodiments, the focal point oscillation can have at least one frequency ($\omega$). In addition or alternatively, the focal point oscillation path may have a path length (l). In particular, the frequency ($\omega$) may be 100 Hz or more, preferably 2 kHz or more. Moreover, the path length (l) can be at least 0.1 mm, preferably 0.5 mm or more. Thereby, a variable shaping of the intensity distribution within the x-y plane, e.g. the focal plane, of the electromagnetic wave beam can be achieved. This in turn allows for high quality treatment of a workpiece, such as cutting, by the generated beam.

According to further embodiments, the exciter means may have a third exciter unit for inducing a z direction component of the focal point oscillation, with the z direction being perpendicular to the x-y plane. Thus, the induced focal point oscillation may include a component in z-direction.

Further, the amplitudes of the focal point oscillation excitable by the exciter means in at least one of the x direction, y direction and z direction can be equal to or smaller than +/−1 mm, preferably at least +/−0.01 mm. Thereby, a finely adjusted beam spot diameter can be realized.

As mentioned above, embodiments include a control unit for controlling the exciter means. In particular, the control unit can include a database of predefined 2- and 3-dimensional Lissajous Figures and the control unit can be configured to control the exciter means in a way such that the generated focal point oscillation path corresponds to one or a combination of more than one of the predefined Lissajous Figures. Thereby, a superposition of two or more harmonic oscillations of the focal point can be realized.

Moreover, the control unit can be configured to independently adjust the phases of the focal point oscillation in any of the x, y and z directions. This allows providing a huge variety of oscillation types.

Further, the control unit can be configured to orientate the oscillation path in the x-y plane in dependency on a treatment direction, in particular a cutting direction, of the beam. Thereby, the oscillation path can be rotated when the treatment direction follows a curve. Moreover, when the treatment direction follows a straight line, the orientation of the oscillation path can be maintained.

The functional connection of the respective optical element to the exciter means is for inducing an oscillating repetitive movement exclusively of the optical element. In particular, the oscillating repetitive movement of the optical element provides the focal point oscillation. Thereby, the focal point oscillation can be reliably effected.

According to some embodiments, the optical element can be a lens device selected from a focal lens, a collimating lens or a combination thereof, the lens device being functionally connected to the exciter means for transmission of an excitation of the exciter means to provide a oscillating repetitive movement of the lens device in an X-Y plane parallel to the x-y plane, the oscillating repetitive movement of the lens device inducing the oscillation of the focal point in x direction and/or y direction.

In other embodiments, the optical element may be one of an optical fiber, a fiber coupling, an end cap or any combination thereof, a free end of the optical element being functionally connected to the exciter means for transmission of an excitation of the exciter means to provide an oscillating repetitive movement of the free end of the optical element in an X-Y plane parallel to the x-y plane, the oscillating repetitive movement of the free end of the optical element inducing the oscillation of the focal point in x direction and/or y direction.

According to further embodiments, the optical element can be an off-axis paraboloid mirror having a center and configured for deflecting the beam by a deflection angle, the mirror being functionally connected to the exciter means for transmission of an excitation of the exciter means to provide a oscillating repetitive movement of the mirror in an X-Y plane which is the tangent plane at the center of the mirror, the oscillating repetitive movement of the mirror inducing the oscillation of the focal point in x direction and/or y direction. The oscillating repetitive movement of the mirror in the tangent plane at the center of the mirror may result in a variation of the deflection angle.

Moreover, the functional connection of the respective optical element to the exciter means can be for transmission of the excitation of the exciter means to further provide a Z direction component of the oscillating repetitive movement of the respective optical element. Thereby, a z component of the focal point oscillation can be realized.

According to further embodiments, the exciter means can include at least one element selected from a piezo actuator, a quartz crystal oscillator, an eccentric, a device for producing an oscillating electromagnetic field, and a MEMS (micro electro mechanical system) oscillator. These embodiments allow for a reliable functional connection of the optical element to the exciter means as well as an appropriate oscillating repetitive movement of the optical element. In one example, the device for producing an oscillating electromagnetic field may be provided in the optical device at a distance to the optical element at which magnets are attached, the optical element thereby during operation being caused to hover and oscillate within the oscillating electromagnetic field.

In additional embodiments, the size of the focal point may be controllable by the magnification of the optical system and the initial diameter of the electromagnetic beam. For instance, the size of the focal point can be at least 0.1 mm, preferably 0.15 mm or more and not more than 0.4 mm. Thereby, a fine adjustment of the spot size can be realized.

Some embodiments provide a use of an optical device according to any one of above embodiments for shaping an electromagnetic wave beam.

A further embodiment is directed to a beam treatment device, in particular a beam cutting device, including a treatment head, in particular a cutting head, for directing an electromagnetic wave beam onto a surface of a material to be treated by the electromagnetic wave beam, the treatment head including an optical device according to any one of the above embodiments.

Yet other embodiments provide use of a beam treatment device according to above further embodiment for cutting the surface of a material to be cut by the electromagnetic wave beam.

According to one embodiment, a beam treatment method, in particular a beam cutting method, using an optical device and/or a beam treatment device of any of above embodiments, includes generating an electromagnetic wave beam by a source, the beam having a beam propagation direction and a focal point, irradiating the beam onto an optical element positioned within the beam propagation direction, oscillating the focal point in at least one of an x direction and an y direction of a plane perpendicular to the beam propagation direction along a focal point oscillation path, the x and y directions being non-parallel to each other, wherein the focal point oscillation is induced by an exciter means having at least a first exciter unit for inducing the x direction component of the focal point and at least a second exciter unit for inducing the y direction component of the focal point oscillation, and treating, in particular cutting, the surface of a material to be treated by the electromagnetic wave beam; wherein the focal point oscillation is induced by the exciter means having a functional connection of the respective optical element to the exciter means for inducing an oscillating repetitive movement exclusively of the optical element. Due to inducing focal point oscillation, the above embodiment can provide a beam spot having an increased diameter within the x-y plane, resulting in an increased Beam Parameter Product (BPP). Moreover, because of the focal point oscillation, the beam spot originally output from the beam source can be moved laterally with respect to the propagation direction of the beam, whereby in case of a cutting treatment the energy input into the cutting edge of the workpiece may be improved as compared to the non-oscillated beam spot. This results in improved or even optimized cutting edges of the treated workpiece.

The beam treatment method of above embodiment can be modified using any embodiment of the beam treatment device and/or of the optical device for shaping an electromagnetic wave beam as mentioned above.

Figure 1B:
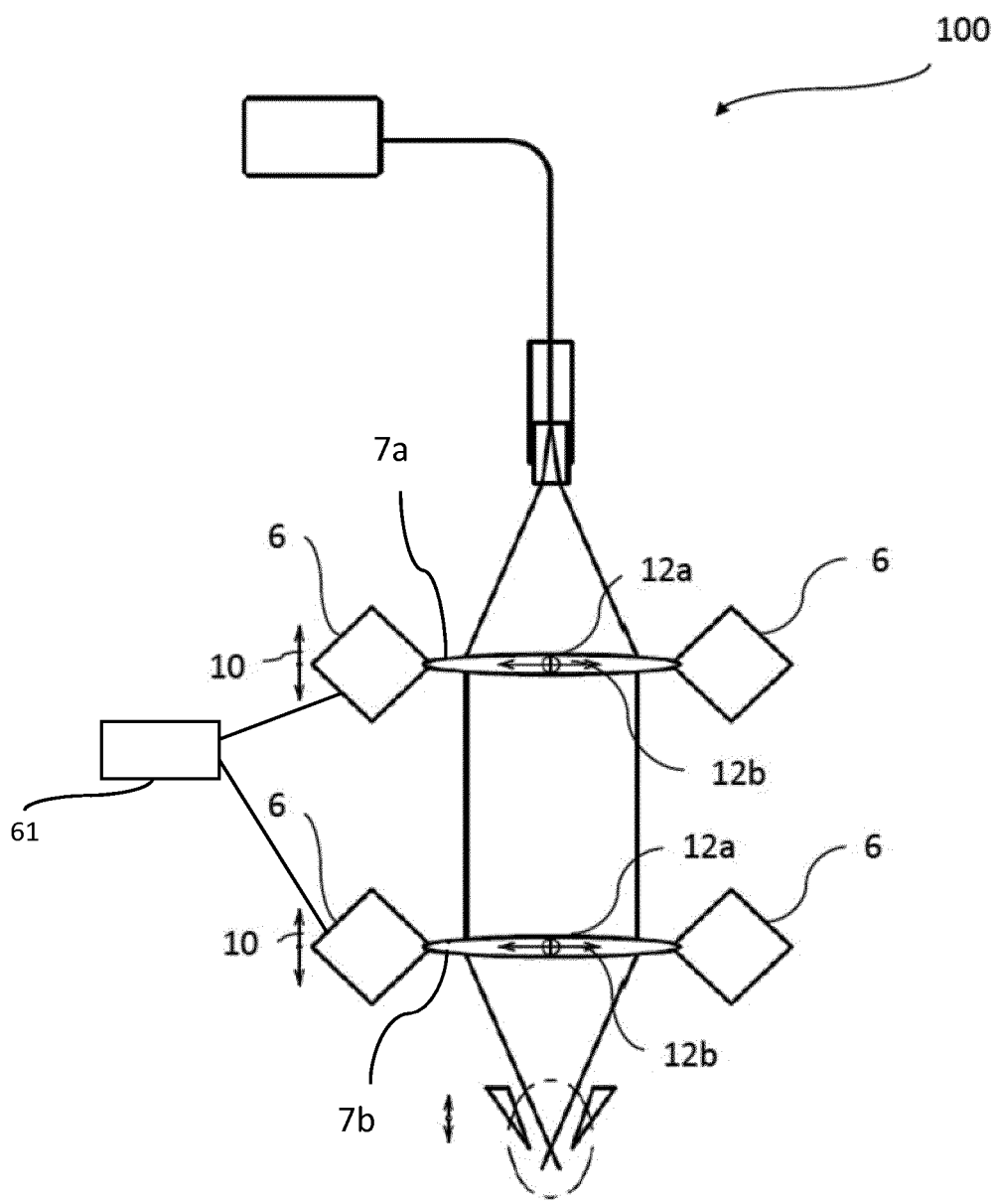
Figure 2A:
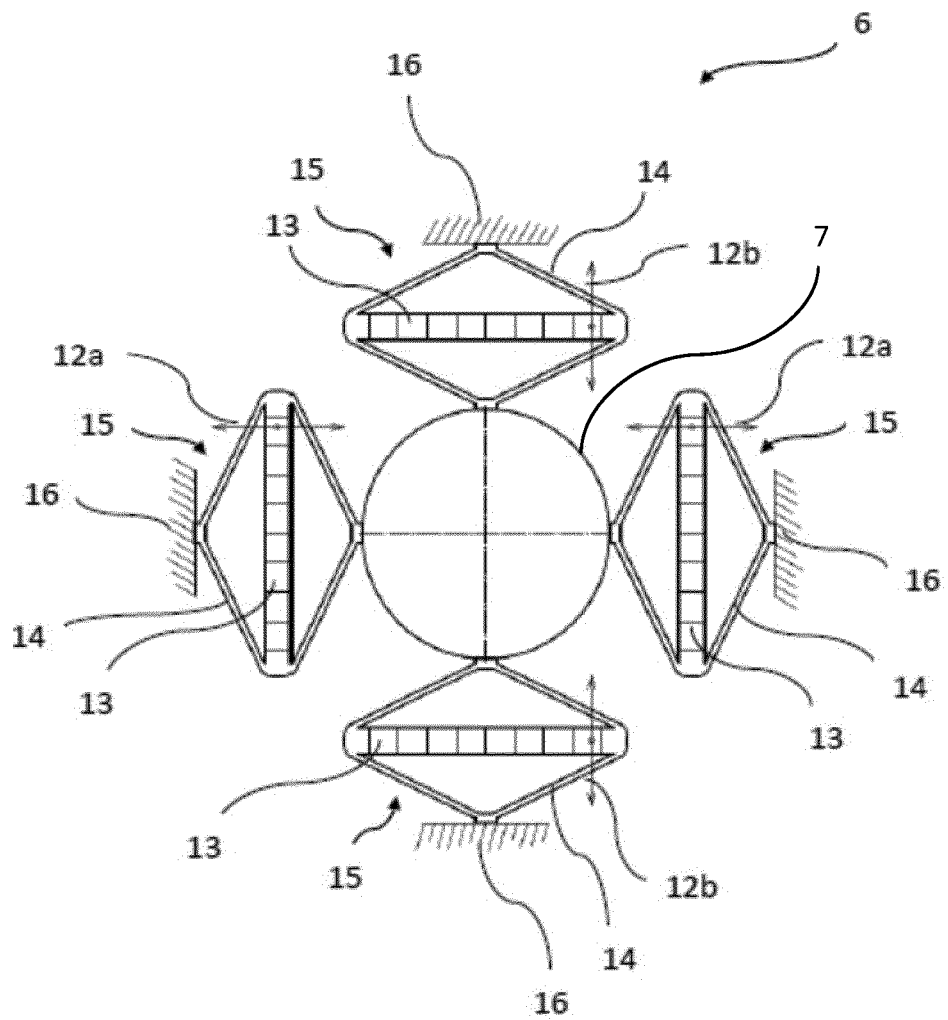
Figure 2B:
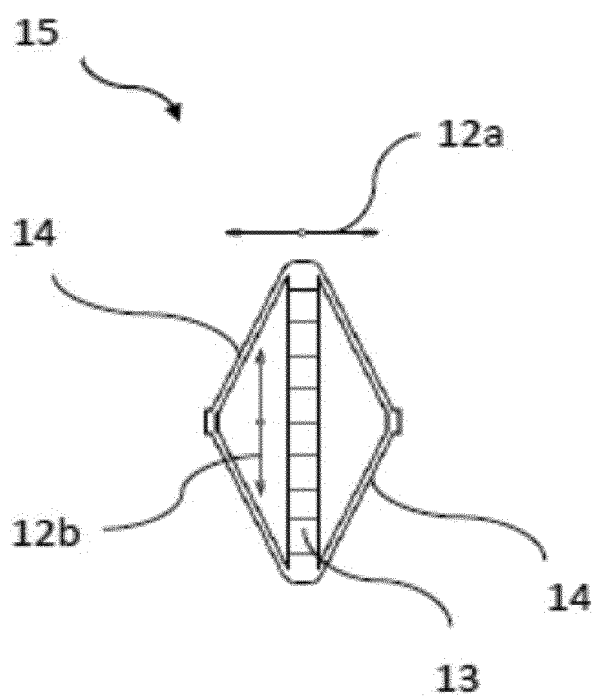
Figure 2C:
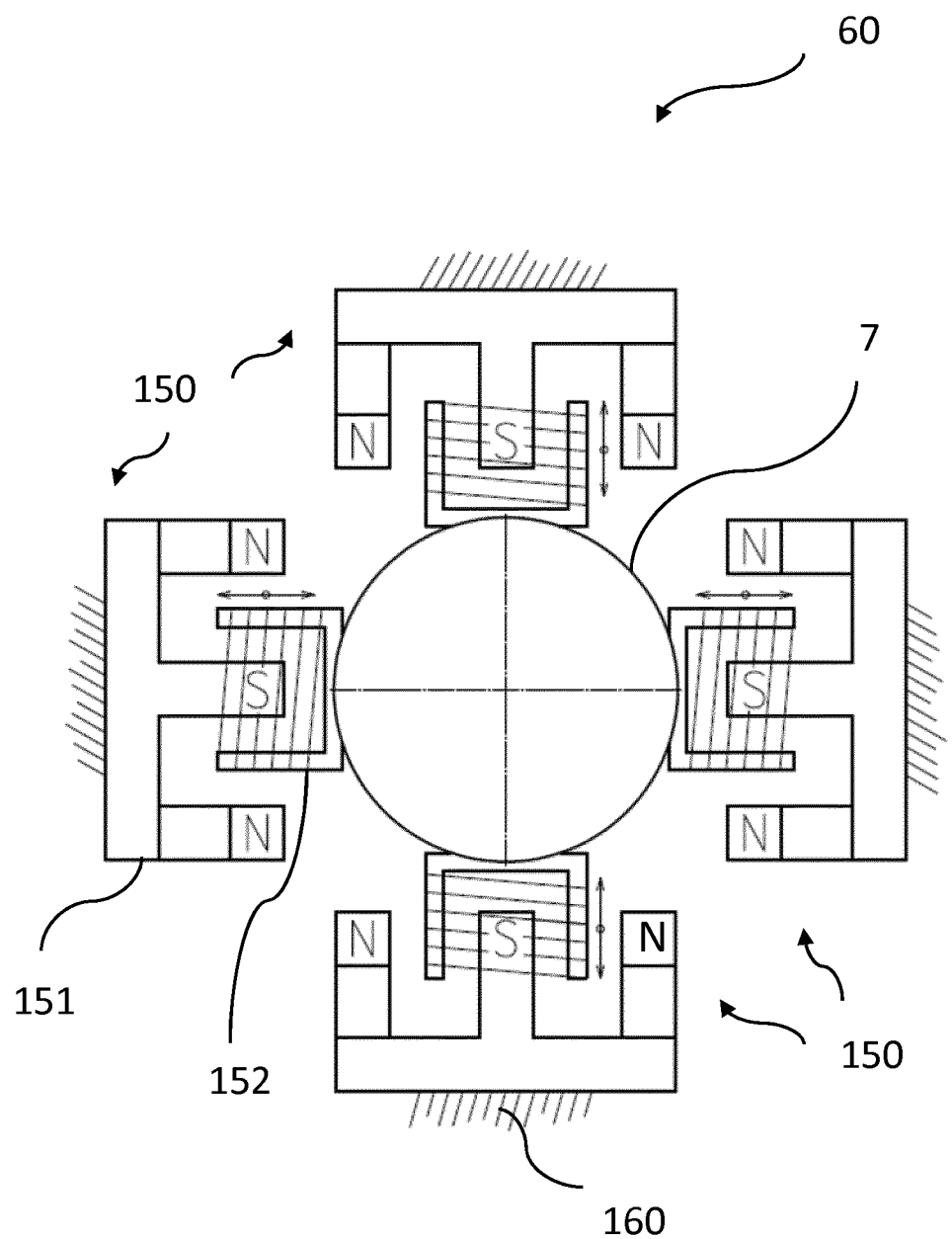
Figure 2D:
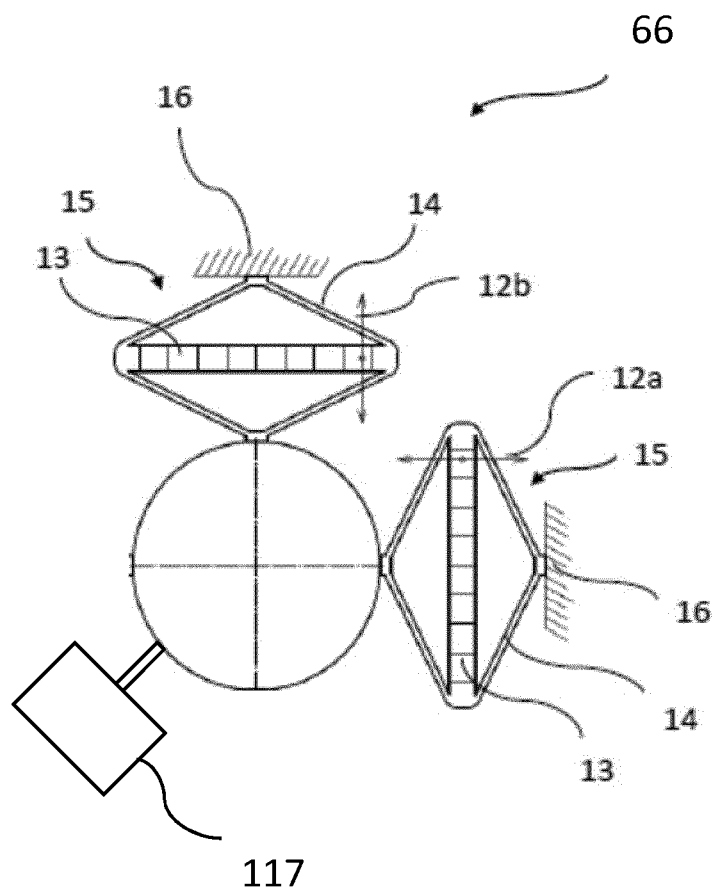
Figure 3A:
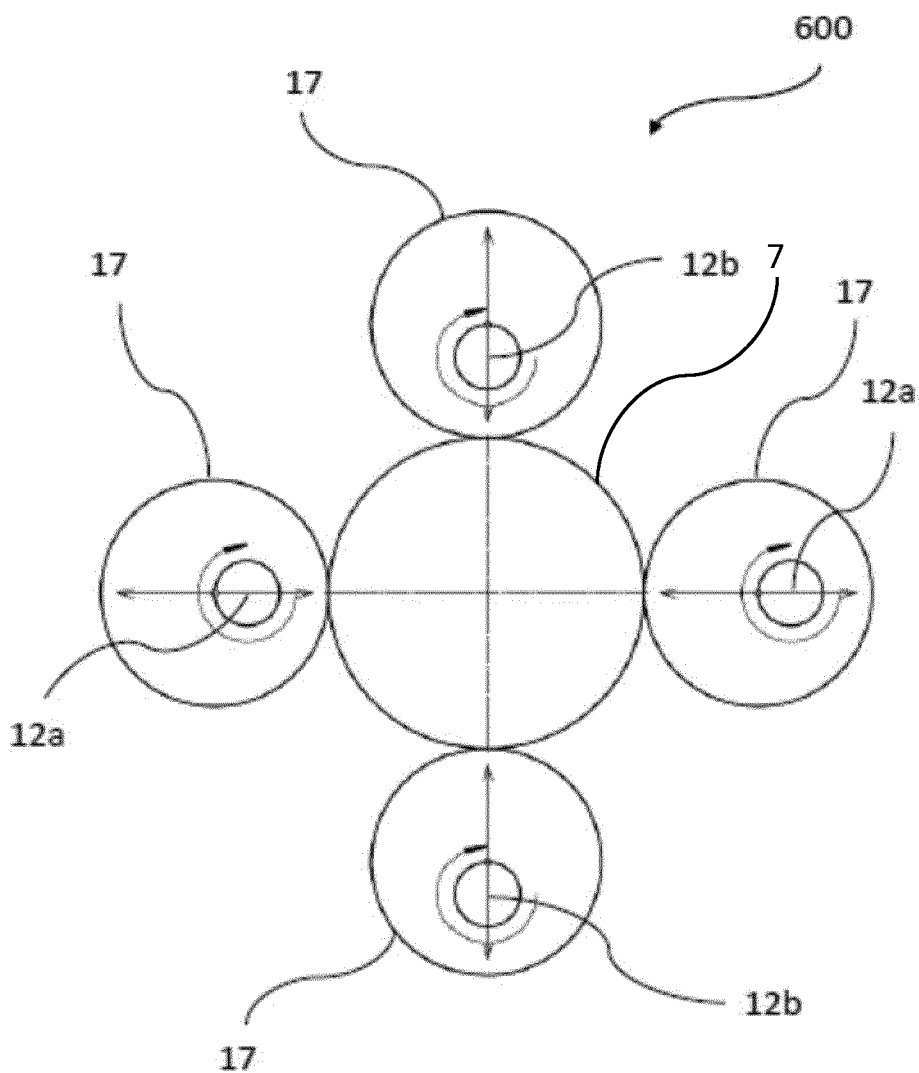
Figure 3B:
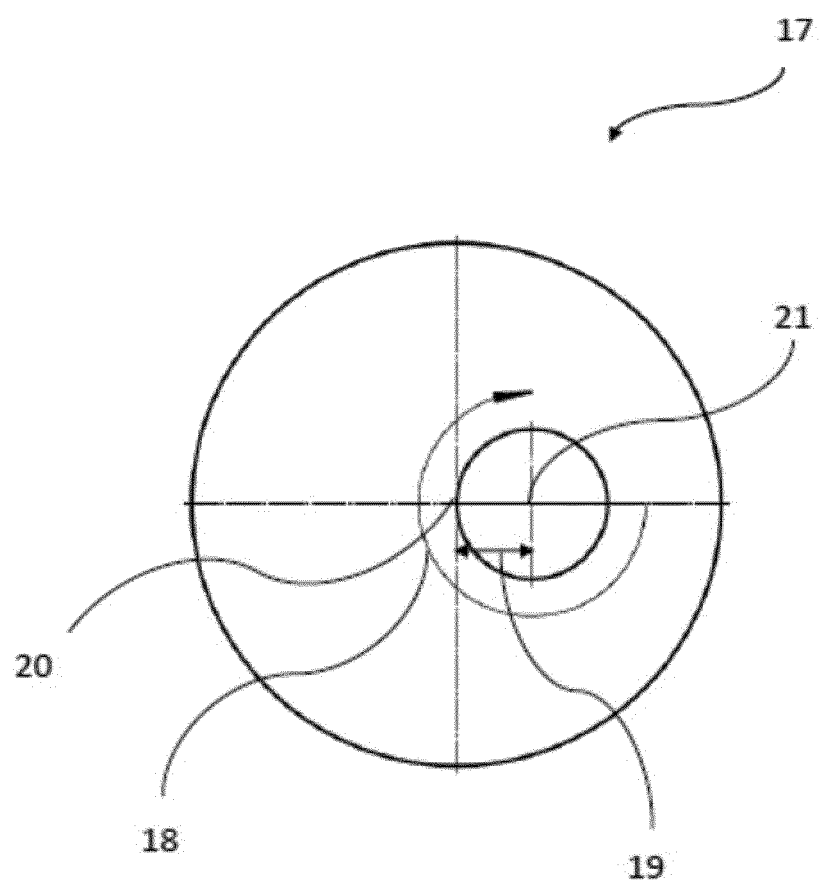
Figure 4:
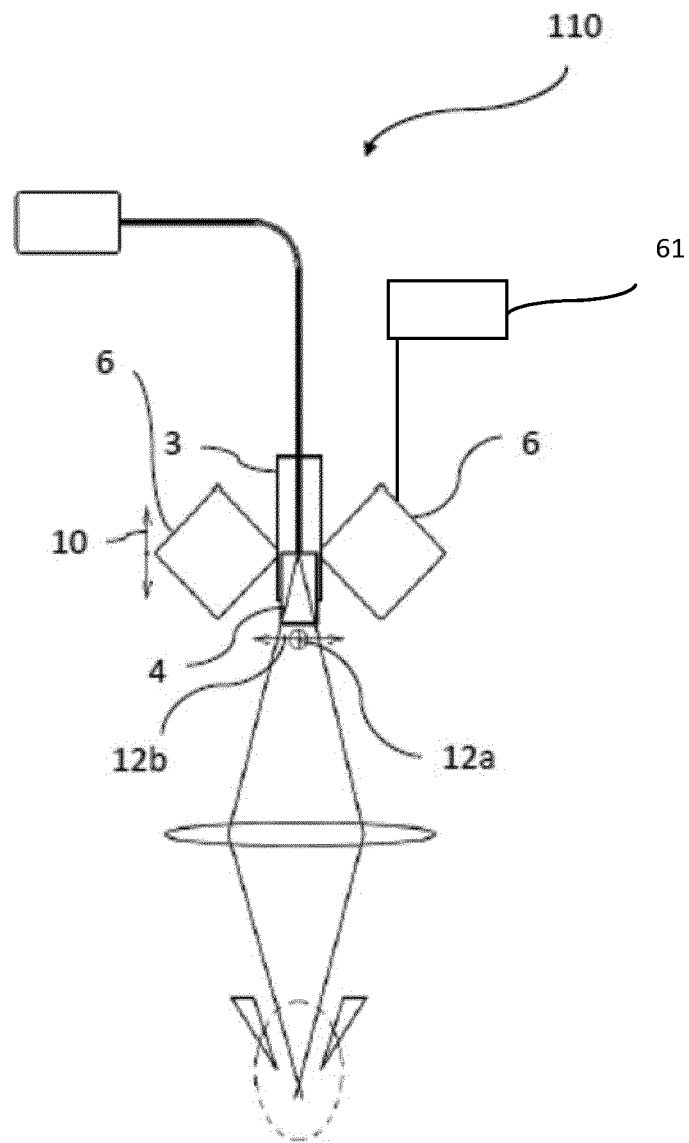
Figure 5:
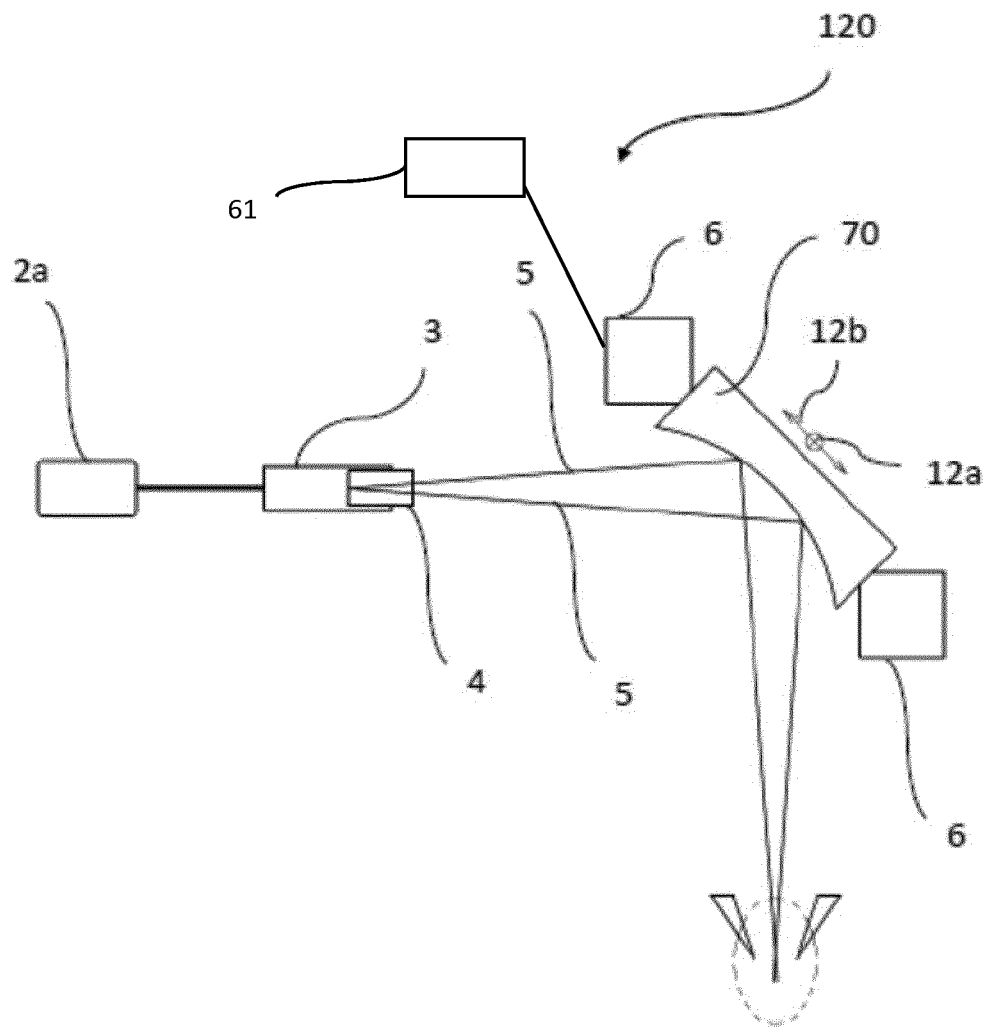
Figure 6:
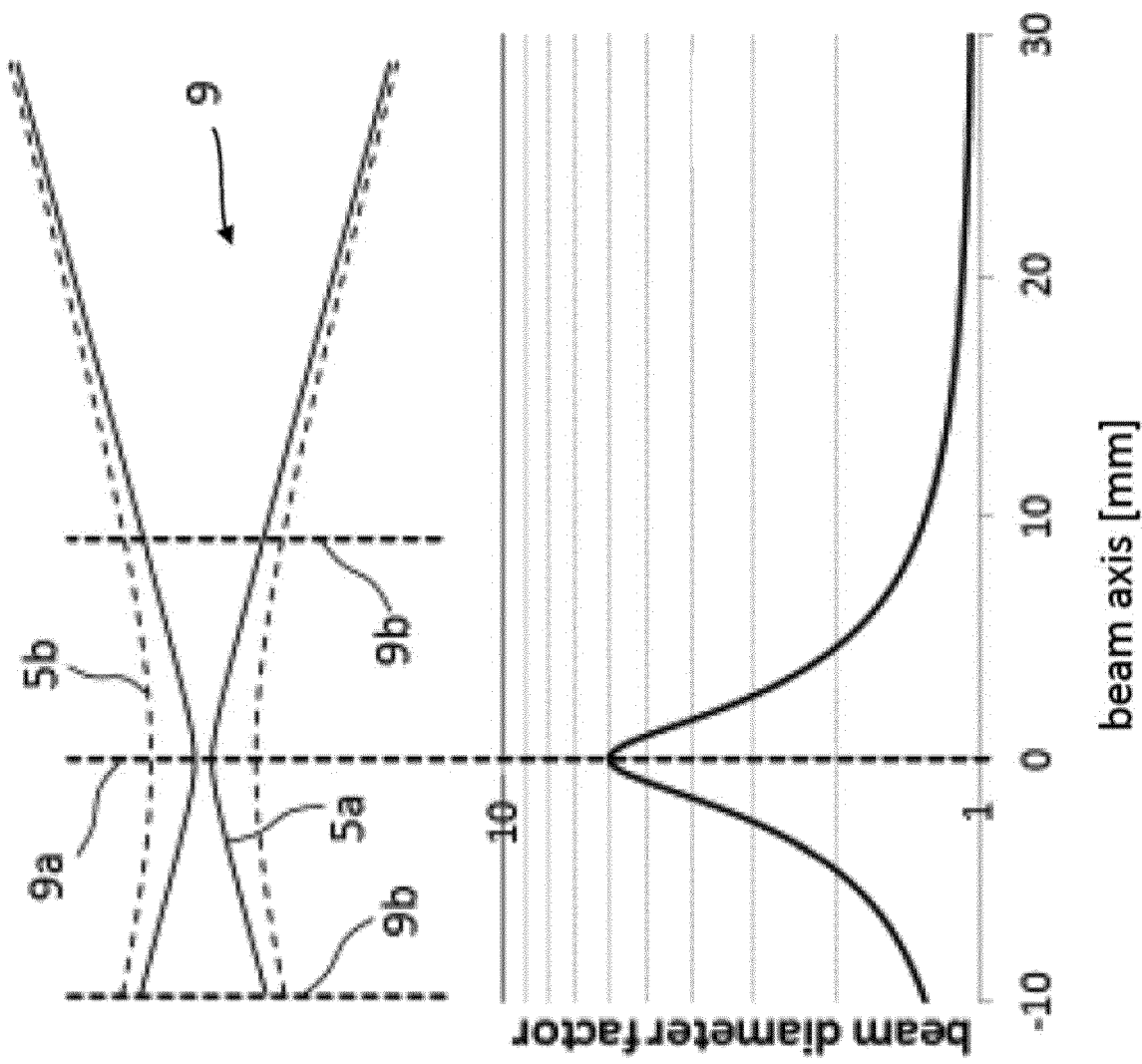
Figure 7:
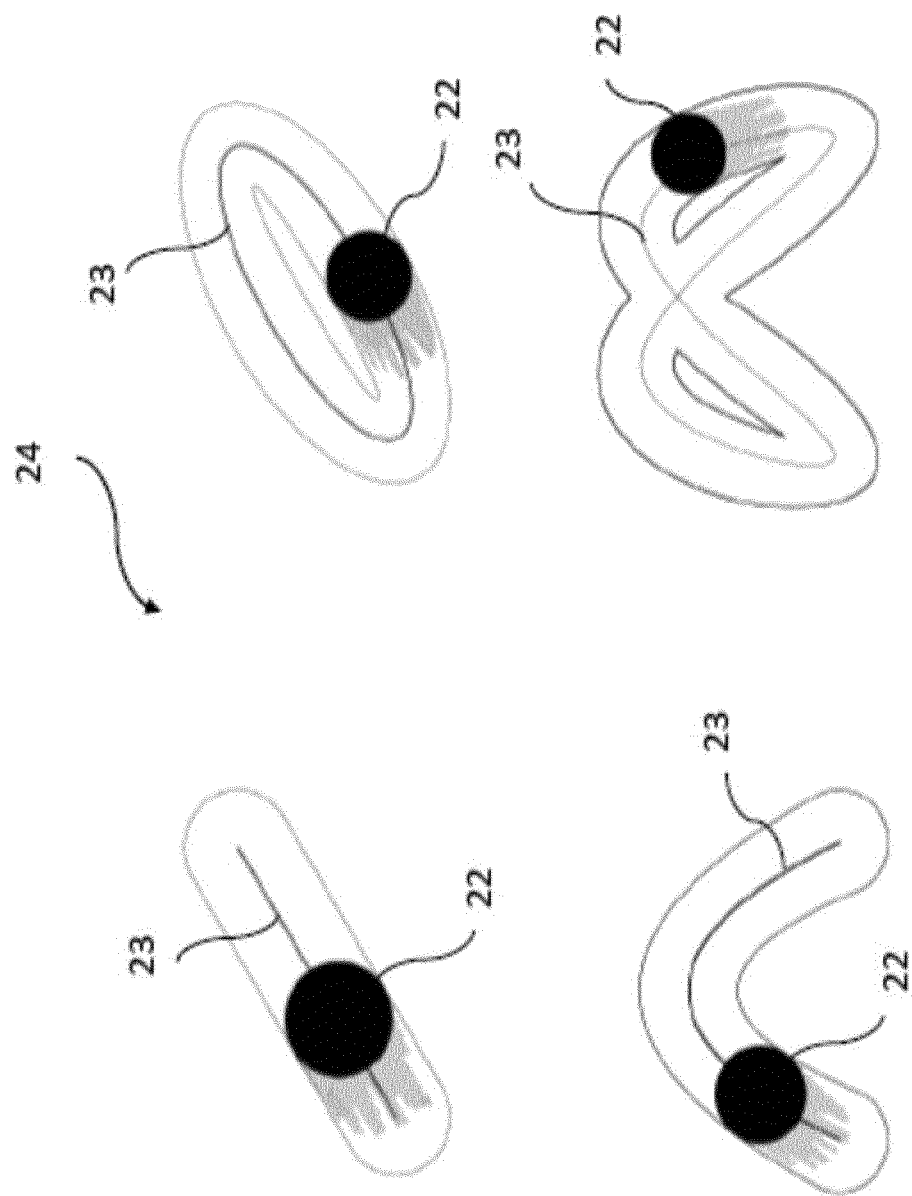
Figure 8:
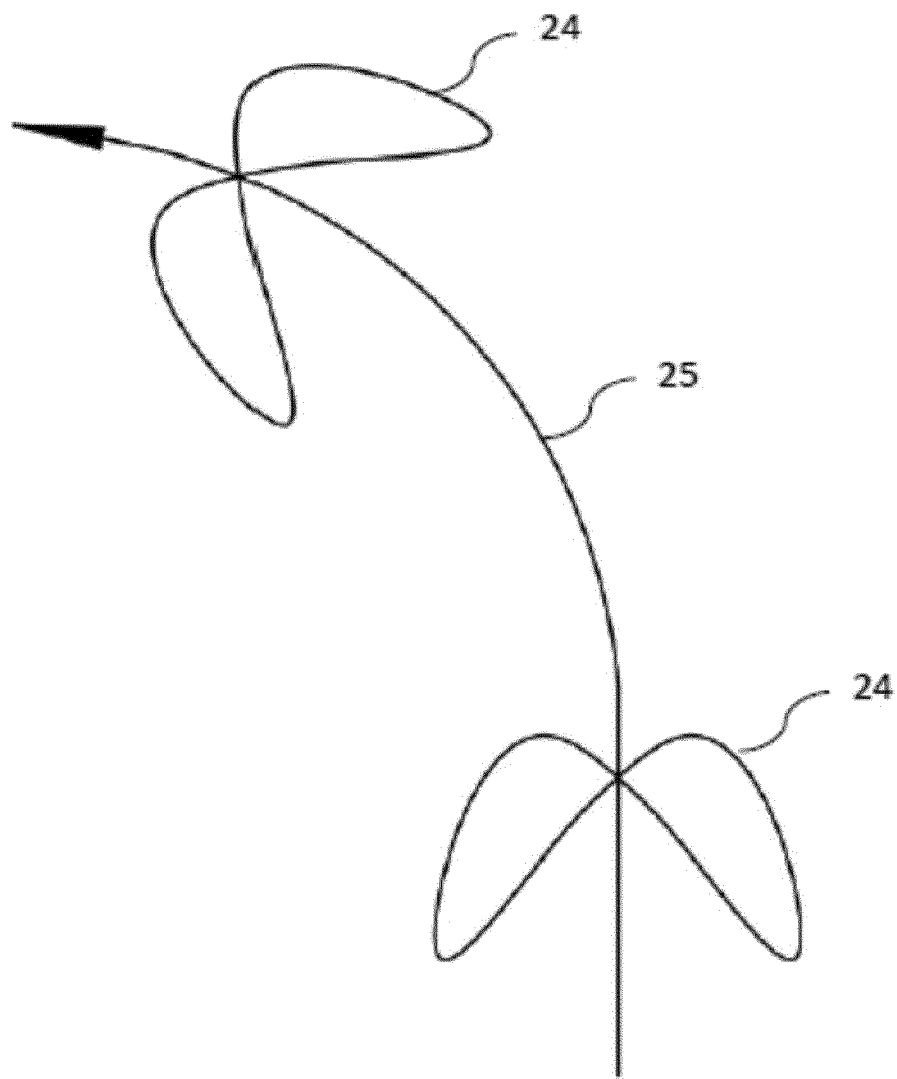

Some of the above mentioned embodiments will be described in more detail in the following description of typical embodiments with reference to the following drawings in which FIG. 1a schematically shows an optical device 1 according to one embodiment of the invention;

FIG. 1b schematically shows an optical device 100 according to an embodiment of the invention;

FIG. 2a schematically illustrates an exciter means 6 according to an embodiment of the invention;

FIG. 2b schematically illustrates an exciter unit 15 of exciter means 6 according to above embodiment;

FIG. 2c schematically illustrates an exciter means 60 according to an embodiment of the invention;

FIG. 2d schematically illustrates an exciter means 66 according to an embodiment of the invention;

FIG. 3a schematically shows an exciter means 600 according to a further embodiment of the invention;

FIG. 3b schematically shows an exciter unit 17 of an exciter means according to a further embodiment of the invention;

FIG. 4 schematically illustrates an optical device 110 according to an embodiment of the invention;

FIG. 5 schematically illustrates an optical device 120 according to an embodiment of the invention;

FIG. 6 schematically shows the focal region 9 obtained by the device of FIG. 1 and the resulting beam diameter factor vs. the focal position;

FIG. 7 illustrates examples of predefined 2-dimensional Lissajous Figures stored in the control unit of one embodiment; and FIG. 8 shows how the example of the Lissajous Figure at the right bottom of FIG. 7, i.e. the correspondingly obtained oscillation of the focal point, is realized along the cutting path of the electromagnetic wave beam.

Within the following description of the drawings, the same reference numbers refer to the same components. Generally, only the differences with respect to the individual embodiments are described. In the following, embodiments are described referring to a cutting process, but are not restricted thereto. Rather, any beam treatment process can be performed using embodiments of the invention.

The optical device according to embodiments of the invention has an optical element positioned within beam propagation direction, and an exciter means functionally connected to the optical element for inducing an oscillation of the focal point in at least one of an x direction and a y direction of a plane perpendicular to the beam propagation direction along a focal point oscillation path. The functional connection of the optical element to the exciter means is for inducing a movement exclusively of the optical element effecting the focal point movement. The movement of the optical element is an oscillating repetitive movement.

FIG. 1a schematically shows an optical device 1 according to one embodiment of the invention. Optical device 1 includes an optical element formed by one focusing lens 7. A laser source 2a generates a laser beam which is guided through laser light guiding fiber 2b coupled to the laser source 2a. At the free end of fiber 2b a fiber coupling 3 is provided. The fiber coupling 3 includes an endcap 4, by which the laser beam is spread in beam propagation direction. The beam is confined by outer beam rays 5, forming circular beam spots perpendicular to the beam propagation direction. The beam propagates to a focusing lens 7 located within the beam propagation direction. The beam is transmitted by the focusing lens 7 towards and through a nozzle 8, generating a focal range 9 including the focal point as shown in FIG. 6.

By moving the optical element in parallel to the beam propagation direction using a shifting device (not shown), the position of the focal point can be changed along the beam propagation direction. Alternatively, for adjusting the focal position along the beam propagation direction, the nozzle 8 may be moved in parallel to the beam propagation direction by a distance 11.

The focusing lens 7 is functionally connected to an exciter means 6 which in the present embodiment induces an oscillating repetitive movement of the focusing lens 7. The exciter means 6 is configured to provide a component 12a in X direction, a component 12b in Y direction of the oscillating repetitive movement of the focusing lens 7, the X and Y directions being perpendicular to the beam propagation direction.

In the present embodiment, the oscillating repetitive movement of lens 7 effected by exciter means 6 corresponds to a superposition of two harmonic oscillations in X-Y directions.

If desired, the two harmonic oscillations of lens 7 in X-Y directions may be further superposed by component 10 of a movement in Z direction. The movement in Z direction may also be implemented as an oscillating repetitive movement of lens 7, effected by a corresponding shifting device of exciter means 6.

In operation, the oscillating repetitive movement of lens 7 provided by exciter means 6 induces the oscillation of the focal point of the laser beam in x direction and/or y direction perpendicular to the beam propagation direction, and optionally in z direction parallel to the beam propagation direction.

According to embodiments, a displacement range of the optical element can be provided, which allows a centering of the beam within the nozzle just by the movement, in particular by the oscillating repetitive movement, of the optical element.

FIG. 1b schematically illustrates an optical device 100 according to a further embodiment of the invention. Optical device 100 includes an optical element formed by a combination of a collimating lens 7a and a focusing lens 7b. As compared to the embodiment shown in FIG. 1a, this embodiment has two exciter means 6, one inducing an oscillating repetitive movement of the collimating lens 7a and the other one inducing an oscillating repetitive movement of focusing lens 7b. According to the present embodiment, the oscillating repetitive movements of both lenses 7a and 7b may be harmonic and identical. However, according to a modification of this embodiment, the oscillating repetitive movements of lenses 7a and 7b may differ from each other, e.g. for inducing specific oscillations of the focal point.

Operating the device shown in FIG. 1a, the oscillating repetitive movement of lenses 7a and 7b effected by the two exciter means 6 induces the oscillation of the focal point of the laser beam in x direction and/or y direction, and optionally in z direction.

According to embodiments, the optical element can be a combination of two lenses of the same type or of different types, which are functionally connected to exciter means. By dynamically moving the two lenses, such as the collimating lens 7a and the focusing lens 7b of the embodiment shown in FIG. 1b, differently with respect to each other, the displacement range of the entire optical element can be increased.

The principles described here with respect to the optical element in form of focusing lens 7 or lenses 7a and 7b may also be applied to other optical elements such as a fiber coupling 3 (as described with respect to FIG. 4) or an off-axis paraboloid mirror 70 (as described with respect to FIG. 5).

FIG. 2a schematically illustrates exciter means 6 according to an embodiment of the invention, which is exemplarily described referring to optical device 1 of FIG. 1. Exciter means 6 is formed of a Cartesian arrangement of four exciter units (oscillators) 15 in the X-Y plane represented by X, Y components 12a and 12b of FIG. 1. The exciter units 15 are attached, e.g. soldered, glued, or clamped, to the optical element in form of lens 7 at coordinates of the orthogonal X and Y directions. However, according to a modification of exciter means 6, the arrangement of the exciter units 15 can be non-orthogonal. The four exciter units 15 are connected to a housing (not shown) of the optical device 1 by attachments 16 including electrical feedthroughs (not shown) for power supply and data conducting connection to a control unit (not shown).

As presented in FIG. 2b, the exciter units 15 each include one or more piezo actuators 13 embedded into solid joints 14, which convert piezo deflection into actuator travel distances of up to +/−1 mm corresponding to the X/Y components prescribed by the control unit. It should be mentioned that the orientation of the piezo actuators 13 in their longitudinal direction and the according orientation of the exciter unit 15 could be in parallel to a Z direction which is perpendicular to the X-Y plane. Stiffness in Z direction of the exciter unit 15 may be improved by such orientation parallel to the Z direction.

In case that a Z component is to be implemented in an oscillating repetitive movement of lens 7 shown in FIG. 1, the shifting device mentioned above as being included in exciter means 6 may be realized by additional piezo actuators 13 attached to the exciter units 15, oscillating the exciter means 6 in Z direction.

FIG. 2c schematically illustrates an exciter means 60 according to an embodiment of the invention, whereby the excitation is induced by electromagnetic actuation. This embodiment is again exemplarily described referring to optical device 1 of FIG. 1. The exciter means 60 includes a device for producing an oscillating electromagnetic field, providing a Cartesian arrangement of four exciter units (oscillators) 150 in the X-Y plane which is represented by X, Y components 12a and 12b of FIG. 1. Each exciter unit 150 is formed by a linear voice coil actuator (VCA) having a magnetic housing 151 and a coil 152 positioned within the housing. The force which may be generated by the VCA is proportional to the current that flows through the coil. The exciter units 150 are attached, e.g. soldered, glued or clamped, to the optical element in form of lens 7 at coordinates of the orthogonal X and Y directions. According to a modification of exciter means 60, the arrangement of the exciter units 150 may alternatively be non-orthogonal. The four exciter units 150 are connected to a housing (not shown) of the optical element 1 by attachments 160 including electrical feedthroughs (not shown) for power supply and data conducting connection to a control unit (not shown). It should be mentioned that magnetic housing 151 and coil 152 may be arranged vice versa of what is shown in FIG. 2c.

During operation, the linear movement of each VCA 150 attached to the lens 7 is controlled by the control unit, thereby providing an oscillating repetitive movement of lens 7 in X and/or Y directions parallel to and in accordance with the x, y components of the desired focal point oscillation. A shifting device as mentioned above may also be implemented in the embodiment of FIG. 2c for shifting or oscillating the exciter means 60 in Z direction.

FIG. 2d schematically illustrates exciter means 66 according to an embodiment of the invention, which is exemplarily described referring again to optical device 1 of FIG. 1. Exciter means 66 is formed of two exciter units (oscillators) 15 in the X-Y plane represented by X, Y components 12a and 12b of FIG. 1. The exciter units 15 are similar to the ones described with respect to FIGS. 2a and 2b and are attached, e.g. soldered, glued, or clamped, to the optical element in form of lens 7. A passive guide element 117 is arranged between the optical element, in this embodiment e.g. lens 7, and the attachment 16. The passive guide element 117 keeps the optical element in the X-Y plane and allows actuation in X and Y directions. Alternatively to the exciter units 15 exciter units 150 as described with respect to FIG. 2c or exciter units 17 as described with respect to FIG. 3a may be used instead. The optical element could also be realized as a fiber coupling 3 as described with respect to FIG. 4 or an off-axis paraboloid mirror 70 as described with respect to FIG. 5.

Embodiments including a Cartesian arrangement of exciter units (oscillators) in the X-Y plane of the optical element provide a prescribed movement of the optical element, the movement being selectable within the X-Y plane as desired. Moreover, the movement of the optical element can be chosen to be an oscillating repetitive movement, the frequency provided by the exciter means being variable. By choosing a suitable excitation energy, the oscillation amplitude can be selected as desired. By selecting a phase shift of the exciter units, the pattern of the focal point movement can be varied. In case that two oscillating exciter circuits are implemented, patterns of the focal point movement corresponding to Lissajous Figures as presented in FIG. 7 can be realized.

As mentioned above, embodiments include a control unit for controlling the exciter means. In some embodiments, the control unit can include a database of predefined 2- and 3-dimensional Lissajous Figures. The control unit can be configured to control and/or can control the exciter means such that the generated focal point oscillation path corresponds to one or a combination of more than one of the predefined Lissajous Figures. Thereby, a superposition of two or more harmonic oscillations of the focal point can be realized. Thus in some examples, the control unit includes a database of predefined 2- and/or 3-dimensional Lissajous Figures to control the exciter means for generating the focal point oscillation path corresponding to one or a combination of more than one of the predefined Lissajous Figures.

FIG. 3a schematically shows an exciter means 600 according to a further embodiment of the invention, again exemplarily described referring to optical device 1 of FIG. 1. Exciter means 600 is formed by a polar arrangement of four exciter units 17, the arrangement being parallel to the plane represented by X, Y components 12a and 12b of FIG. 1. The exciter units 17 are each formed of an eccentric circular disk mechanically contacting lens 7 and having two axis in X, Y directions. As exemplarily indicated in FIG. 3b for one of the eccentric circular disks providing the movement of lens 7 in X direction, an eccentricity 19 is implemented by arranging axis 21 of an eccentric rod (not shown) at a distance in X direction from axis 20 of the eccentric disk. Each rod is functionally connected to a corresponding drive system (not shown). During operation, the rotation 18 of each eccentric rod attached to the respective eccentric circular disk is controlled by the control unit 61, thereby providing an oscillating repetitive movement of lens 7 in X and/or Y directions parallel to and in accordance with the x, y components of the desired focal point oscillation.

By embodiments having a polar arrangement of exciter units, the optical element can be rotated non-centrically with respect to its optical center. In modifications of these embodiments, the eccentricity and/or the rotational velocity of the optical element can be varied.

According to embodiments, the control unit can be configured to independently adjust the phases of the focal point oscillation in any of the x, y and z directions.

FIG. 4 schematically illustrates an optical device 110 according to an embodiment of the invention, in which the optical element is formed by a free end of an optical fiber 2b, a fiber coupling 3 and an endcap 4, as shown in FIG. 1a. Alternatively, the optical element may be formed by a free end of the laser light guiding fiber 2b. The laser light guiding fiber 2b is coupled to the laser source 2a. The fiber coupling 3, including the end cap 4, is functionally connected to the exciter means 6 as described above referring to FIGS. 2a and 2b. That is, exciter means 6 is formed of a Cartesian arrangement of the four exciter units 15 in the X-Y plane, represented by X, Y components 12a and 12b of FIG. 1, the X-Y plane being parallel to plane x-y of the focal point oscillation. However, exciter means 60, 66 or 600 of other embodiments can alternatively be used. In the present embodiment, the exciter units 15 are attached to the fiber coupling 3 at coordinates of the orthogonal X and Y directions. The four exciter units 15 are connected to a holder (not shown) of the optical device 110 by attachments 16 including electrical feedthroughs (not shown) for power supply and data conducting connection to a control unit (not shown). The exciter units 15 each include piezo actuators 13 embedded into solid joints 14, as shown in FIG. 2b, which convert piezo deflection into actuator travel distances of up to +/−1 mm corresponding to the X/Y components prescribed by the control unit. During operation, excitation of the exciter means 6 is transmitted to the free end of fiber 2b, the free end being confined by a beam exit plane. Thereby, an oscillating repetitive movement of the beam exit plane of the free end of the optical fiber is effected in the X-Y plane parallel to the x-y plane. Hence, the oscillating repetitive movement of the free end of the optical fiber 2b induces the oscillation of the focal point in x direction and/or y direction. A shifting device as mentioned above may also be implemented for shifting or oscillating the exciter means 6 in Z direction, as indicated in FIG. 4 by Z direction component 10.

FIG. 5 schematically illustrates an optical device 120 of another embodiment of the invention. According to this embodiment, the optical element is an off-axis paraboloid mirror 70 having a center. Mirror 70 is positioned within the beam propagation direction to deflect the laser beam emitted from source 2a by a deflection angle of about 90°. However, other examples of this embodiment may allow for other deflection angles. The mirror 70 is functionally connected to the exciter means 6 as described above with respect to FIGS. 2a and 2b. That is, exciter means 6 is formed of a Cartesian arrangement of four exciter units 15 in X-Y plane, which is in this embodiment the tangent plane at the center of the mirror. In the present example the X-Y plane is inclined by about 45° to the plane represented by x, y components of the focal point oscillation. The exciter units 15 are attached, e.g. soldered, glued or clamped, at the sides of mirror 70 at coordinates of the orthogonal X and Y directions. Thereby, during operation, an excitation of the exciter means 6 is transmitted to mirror 70, providing an oscillating repetitive movement of mirror 70 in the X-Y plane. The resulting oscillating repetitive movement of the mirror 70 induces the oscillation of the focal point in x direction and/or y direction. In the present embodiment, instead of exciter means 6, exciter means 60, 66 or 600 of other embodiments can alternatively be used.

FIG. 6 schematically illustrates the focal region 9 obtained by the device of FIG. 1 using the exciter means 6 shown in FIGS. 2a and 2b, as well as the resulting beam diameter factor vs. the position on the beam axis. As shown in the upper illustration of FIG. 6, without oscillation the laser beam is confined by outer beam rays 5a within the focal region 9 and has a beam waist having a minimum at focal plane 9a. However, oscillation of the focal point within the focal plane 9a transforms the laser beam to be confined by outer rays 5b forming a beam waist which is larger than the one without oscillation. Therefore, a higher BPP is achieved. Even at far field plane 9b and as shown in the lower illustration of FIG. 6, the beam spot produced by oscillating the focal point has a larger diameter than the beam spot of the laser beam without oscillating focal point. Thus, due to the fast oscillating movement of the focal point within the focal plane, a beam spot, i.e. a beam intensity distribution, having a larger diameter is provided. Hence, because of the focal point oscillation the energy input into the cutting edge of a workpiece can be improved as compared to the non-oscillated beam spot. Moreover, by varying the focal point oscillation using embodiments of the invention, the beam spot diameter and thereby the parameter product (BPP) can be adjusted as desired for different thicknesses of the material to be cut.

FIG. 7 illustrates examples of predefined 2-dimensional Lissajous Figures stored in the control unit of one embodiment. According to this embodiment, the control unit is configured to control the exciter means 6, 60, 66, 600 in a way such that the generated focal point oscillation path corresponds to one or a combination of more than one of the predefined Lissajous Figures. As is evident from FIG. 7, due to its oscillation in accordance with the Lissajous Figures, the focal point or beam spot 22 can reciprocate or orbit along a movement path 23 within the x-y plane (focal plane). The focal point oscillation has a frequency ($\omega$), and the focal point oscillation path has a path length (l). It is to be noted that the probability of the focal point to locate at a distinct position n in the focal point oscillation path is given by the product of focal point diameter (fpd)/path length (l)*frequency ($\omega$).

FIG. 8 shows how the example of the Lissajous Figure at the right bottom of FIG. 7, i.e. the correspondingly obtained oscillation path of the focal point, is realized along the cutting path 25 of the laser beam. Because of the focal point oscillation, a beam spot and a beam intensity distribution having a larger diameter is provided along the cutting path. Thus, the energy input into the cutting edge of a workpiece can be improved as compared to the non-oscillated beam spot. The control unit controls oscillation of the focal point such that the Lissajous Figure/the oscillation path of the focal point is rotated when the treatment/cutting path forms a curve. That is, the orientation of the oscillation path/Lissajous figure in an x-y plane is dependent on the treatment/cutting direction of the cutting beam in the x-y plane.

CONCLUSION

Using embodiments of the invention, a beam treatment process, in particular a cutting process, can be optimized by adjusting the beam spot diameter and thereby the beam parameter product (BPP), which is particularly advantageous for different thicknesses of the material to be treated/cut. In case of fiber lasers and common solid-state lasers, the BPP is defined by the diameter of the fiber used. By embodiments of the invention, due to the focal point oscillation and the resulting variation of beam spot diameter, the BPP even of fiber lasers and solid-state lasers can efficiently be adjusted. Thus, a beam treatment head or cutting head with "on-the-fly" BPP adjustment can be provided.

Moreover, using embodiments of the invention, due to the focal point oscillation and the resulting variation of beam spot diameter, a variable shaping of the intensity distribution within the x-y plane, e.g. the focal plane, of the electromagnetic wave beam can be achieved. This in turn allows for high quality treatment of a workpiece, such as cutting, by the generated beam. In order to achieve a high quality treatment process, e.g. a cutting process, the pattern of the focal point oscillation can be tailored, as required for different process parameters, such as the cutting kerf, the laser power, the treatment/cutting speed, the gas pressure, the treatment/cutting direction, and the type of material to be treated/cut.

While the foregoing is directed to embodiments and examples of the invention, other and further embodiments of the invention may be devised. Especially, mutually non-exclusive features of the embodiments and examples described above may be combined with each other.

LIST OF REFERENCE SIGNS 1 optical device
2a laser source
2b laser light guiding fiber
3 fiber coupling
4 end cap
5 outer beam rays
5a outer beam rays without focal point oscillation
5b outer beam rays with focal point oscillation
6 exciter means
7 lens
7a collimating lens
7b focusing lens
8 nozzle
9 focal region
9a focal plane
9b far field plane
10 Z component of movement of optical element
11 Z component of movement of nozzle
12a X component of movement of optical element
12b Y component of movement of optical element
13 piezo actuator
14 solid joint
15 exciter unit
16 attachment
17 exciter unit, eccentric circular disk
18 rotation
19 eccentricity
20 axis of the eccentric circular disk
21 axis of an eccentric rod
22 beam spot
23 movement path of the beam spot within the x-y plane
24 Lissajous Figures
25 cutting path
60 exciter means
61 control unit
66 exciter means
70 mirror
100 optical device
110 optical device
117 passive guide element
120 optical device
150 exciter unit
151 magnetic housing
152 coil
600 exciter means

The invention claimed is:

1. An optical device for shaping an electromagnetic wave beam, the beam being generated by a source and having a beam propagation direction and a focal point, comprising:
an optical element positioned within beam propagation direction and being transparent to the beam propagating in the beam propagation direction,
a control unit; and
an exciter means functionally connected to the optical element, wherein the exciter means is controlled by the control unit to move the optical element in a repetitive pattern to induce a focal point oscillation, which is an oscillation of the focal point in at least one of an x direction and a y direction of an x-y plane that is perpendicular to the beam propagation direction, along a controllable focal point oscillation path, the x and y directions being non-parallel to each other, wherein
the exciter means has at least a first exciter unit for inducing oscillation of the focal point in the x direction and at least a second exciter unit for inducing oscillation of the focal point in the y direction, the control unit being configured to control the first exciter unit and the second exciter unit to control oscillation of the focal point in the x direction and the y direction to increase a beam waist of the beam and increase a beam parameter product (BPP), and
the first exciter unit and the second exciter unit acting on the optical element, the optical element being the same for first exciter unit and the second exciter unit, and
the functional connection of the optical element to the exciter means is for inducing an oscillating repetitive movement exclusively of the optical element effecting movement of the focal point,
wherein, the amplitudes of the focal point oscillation excitable by the exciter means in at least one of the x direction and the y direction are equal to or smaller than +/−1 mm.

2. The optical device according to claim 1, wherein the focal point oscillation has at least one frequency ($\omega$), and/or the focal point oscillation path has a path length.

3. The optical device according to claim 2, wherein the at least one frequency ($\omega$) is 100 Hz or more and the path length is at least 0.1 mm.

4. The optical device according to claim 1, wherein the exciter means has a third exciter unit, wherein the control unit controls the third exciter unit to induce a z direction component of the focal point oscillation, with the z direction being perpendicular to the x-y plane.

5. The optical device according to claim 1, wherein
the control unit includes a database of predefined 2- and/or 3-dimensional Lissajous Figures, and the control unit is configured to control the exciter means in a way such that the controllable focal point oscillation path corresponds to one or a combination of more than one of the predefined Lissajous Figures.

6. The optical device according to claim 1, wherein the control unit is configured to independently adjust phases of the focal point oscillation in any of the x direction, y direction, and a z-direction.

7. The optical device according to claim 1, wherein the control unit is configured to orientate the oscillation path in the x-y plane in dependency on a treatment direction of the beam, wherein the treatment direction is a cutting direction.

8. The optical device according to claim 1, wherein the optical element is a lens device selected from a focal lens, a collimating lens or a combination thereof, the lens device being functionally connected to the exciter means for transmission of an excitation of the exciter means to provide the oscillating repetitive movement of the optical element in an X-Y plane parallel to the x-y plane.

9. The optical device according to claim 1, wherein the optical element is one of an optical fiber, a fiber coupling, an end cap or any combination thereof, a free end of the optical element being functionally connected to the exciter means for transmission of an excitation of the exciter means to provide a oscillating repetitive movement of the free end of the optical element in an X-Y plane parallel to the x-y plane, the oscillating repetitive movement of the free end of the optical element inducing the oscillation of the focal point in x direction and/or y direction.

10. The optical device according to claim 1, wherein the optical element is an off-axis paraboloid mirror having a center and configured for deflecting the beam by a deflection angle, the mirror being functionally connected to the exciter means for transmission of an excitation of the exciter means to provide a oscillating repetitive movement of the mirror in an X-Y plane which is the tangent plane at the center of the mirror, the oscillating repetitive movement of the mirror inducing the oscillation of the focal point in x direction and/or y direction.

11. The optical device according to claim 1, wherein the functional connection of the optical element to the exciter means is for transmission of the excitation of the exciter means to further provide a Z direction component of the oscillating repetitive movement exclusively of the optical element.

12. The optical device according to claim 1, wherein the exciter means includes at least one element selected from a piezo actuator, a quartz crystal oscillator, an eccentric, a device for producing an oscillating electromagnetic field, and a MEMS oscillator.

13. The optical device according to claim 1, wherein the size of the focal point is controllable by magnification of the optical device and the initial diameter of the electromagnetic beam.

14. The optical device according to claim 1, wherein the size of the focal point is at least 0.1 mm.

15. A beam treatment device comprising a beam cutting device having a treatment head that includes a cutting head, wherein the treatment head is configured for directing an electromagnetic wave beam onto a surface of a material to be treated by the electromagnetic wave beam, the treatment head including the optical device according to claim 1.

16. A beam treatment method using an optical device according to claim 1, the method comprising:
generating an electromagnetic wave beam by a source, the beam having a beam propagation direction and a focal point,
irradiating the beam onto an optical element positioned within beam propagation direction,
oscillating the focal point in at least one of an x direction and an y direction of a plane perpendicular to the beam propagation direction along a focal point oscillation path, the x and y directions being non-parallel to each other,
wherein the focal point oscillation is induced by an exciter means having at least a first exciter unit for inducing the x direction component of the focal point oscillation and at least a second exciter unit for inducing the y direction component of the focal point oscillation, and treating the surface of a material to be treated by the electromagnetic wave beam, wherein treating includes cutting,
wherein the focal point oscillation is induced by the exciter means having a functional connection of the respective optical element to the exciter means for inducing an oscillating repetitive movement exclusively of the optical element.

17. The optical device according to claim 1, wherein the size of the focal point is 0.15 mm or more and not more than 0.4 mm.

18. The optical device according to claim 2, wherein the frequency ($\omega$) is 2 kHz or more, and/or the path length is 0.5 mm or more.

19. An optical device for shaping an electromagnetic wave beam, the beam being generated by a source and having a beam propagation direction and a focal point, comprising:
an optical element positioned within beam propagation direction and being transparent to the beam propagating in the beam propagation direction;
a controller;
a plurality of oscillators in mechanical communication with the optical element, wherein the controller controls the plurality of oscillators to move the optical element in a repetitive pattern to induce an oscillation of the focal point in at least one of an x direction and a y direction of a plane perpendicular to the beam propagation direction along a controllable focal point oscillation path, the x and y directions being non-parallel to each other; and
wherein
the plurality of oscillators has at least a first oscillator for inducing oscillation of the focal point in the x direction and at least a second oscillator for inducing oscillation of the focal point in the y direction, the control unit being configured to control the first oscillator and the second oscillator to control oscillation of the focal point in the x direction and the y direction to increase a beam waist of the beam and increase a beam parameter product (BPP),
the first oscillator and the second oscillator act on the optical element, which is the same optical element for first oscillator and the second oscillator,
wherein, the amplitudes of the focal point oscillation excitable by the exciter means in at least one of the x direction and the y direction are equal to or smaller than +/−1 mm.

* * * * *